United States Patent Office 2,799,562
Patented July 16, 1957

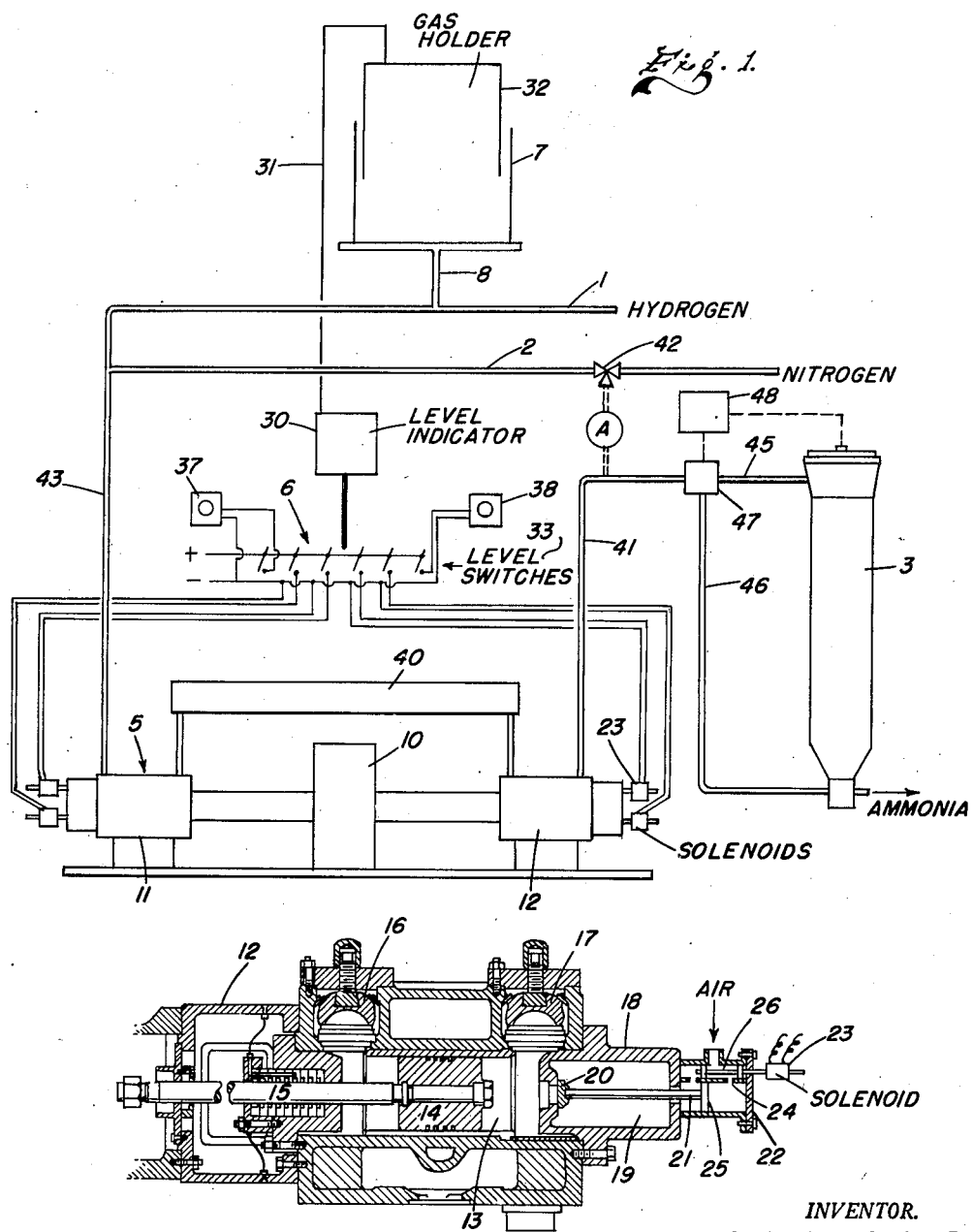

2,799,562

AUTOMATICALLY CONTROLLED GAS COMPRESSION FOR AMMONIA SYNTHESIS

Sidney A. Bresler, New York, N. Y., assignor to Chemical Construction Corporation, a corporation of Delaware Application April 27, 1956, Serial No. 581,187

6 Claims. (Cl. 23—260)

This invention relates to apparatus and processes for maintaining a constant supply of compressed gases for industrial utilities employing such gases. The principles of the invention are particularly applicable to high-pressure conversion processes wherein one or more gases are supplied to a catalytic converter, such as an ammonia synthesis converter operating with a nitrogen-hydrogen gas mixture at pressures on the order of 3000–6000 lbs. per square inch or higher, and will be described with reference to such a process.

The nitrogen and hydrogen gases used for the industrial production of ammonia are frequently obtained from different sources and therefore may be supplied at different rates. For example, the nitrogen is often obtained by the liquefaction and fractionation of atmospheric air, whereas the hydrogen may be produced by the catalytic conversion of natural gas or other hydrocarbons with steam followed by separation of oxides of carbon from the resulting hydrogen. The problem of correlating the supplies of gases from these or other sources to maintain a constant flow of 3 mols of hydrogen and 1 mol of nitrogen to the compressors is therefore quite difficult, and usually requires continuous close supervision by the plant operators.

It is a principal object of the present invention to provide a system whereby a compressed gas may be obtained automatically from a variable flow of feed gas. A further object is the provision of a control system for a gas compressor that will operate on a variable flow of feed gas automatically and without requiring close manual supervision. A still further and more specific object is the provision of an apparatus and method for supplying a flow of nitrogen-hydrogen gas of constant composition to a catalytic ammonia converter from separate variable nitrogen and hydrogen supplies. Additional objects of the invention will become apparent from the following description of a preferred embodiment thereof when taken with the appended claims.

The invention will be further described and illustrated with reference to the accompanying drawings, wherein:

Fig. 1 is a diagrammatic illustration of an ammonia synthesis plant embodying the principles of the invention, and Fig. 2 is a vertical section through a portion of a gas compressor of standard design equipped with an unloader in the form of a clearance pocket, the valve of which is adapted to be actuated by the control system of Fig. 1.

Referring to Fig. 1, the apparatus of my invention includes a supply line 1 for hydrogen, a nitrogen supply line 2, an ammonia converter 3, a compressor indicated generally by reference numeral 5 and a switching system 6 adapted to operate in response to volume changes in a gas holder 7. The gas holder 7 is preferably of the telescopic type, as shown, but may be of any type wherein the gas is stored under constant pressure by means of a dome or top that moves vertically with changes in the volume of gas being stored. This gas holder is in free communication with the hydrogen supply line 1 by means of a connecting pipe 8, and therefore functions to maintain a constant gas pressure in line 2 even though the gas therein may be supplied at fluctuating rates.

The gas compressor 5 may be of any suitable type, but is indicated on Fig. 1 of the drawings as being a motor-driven reciprocating compressor wherein the motor 10 is mounted between a pair of compressor cylinders 11 and 12 driven by connecting rods operating from the crank shaft of the motor. It will be understood that compressors of this type are usually operated at constant speeds, variations in capacity being obtained by unloaders. A typical compressor unit provided with a clearance unloader is shown on Fig. 2 and consists of a compression cylinder 13 containing a piston 14 actuated by a piston rod 15 from a crosshead connected with the crank shaft of the motor 10. Suitable gas inlet and outlet valves 16 and 17 are provided, and these valves may also be provided with unloaders of the closed suction or open inlet-valve type. A closer control of the compressor capacity is obtained, however, by means of one or more clearance unloaders and such a clearance pocket is shown at 18 on Fig. 2 of the drawings. This consists of a reservoir 19 controlled by a valve 20 having a stem 21 which, in accordance with the present invention, is operated automatically by a valve-control means 22. The control means may consist simply of a solenoid 23 surrounding the valve stem and adapted to open or close the valve 20 in response to a flow of electric current, or an air-operated valve-controlled cylinder 24 may be used as shown on Fig. 2. This control mechanism contains an auxiliary piston 25 attached to the valve stem 21 and a suitable solenoid-operated air control valve 26. It will be understood that the inlet valve 16 or the outlet valve 17 may likewise be provided with a solenoid-controlled unloading mechanism so that the compressive action of the cylinder can be by-passed, thus reducing the capacity of the multi-stage compressor.

In order to vary the compressor capacity in accordance with the volume of gas in the gas holder 7 a switching mechanism 6 is provided. In the system illustrated diagrammatically in Fig. 1 of the drawings this system contains a "Varec" automatic tank gauge 30 operated by a cable 31 connected through pulleys to the dome or head 32 of the gas holder 37 and a series of level switches 33 that are closed or opened in response to the movement of the gauge 30. Four operating switches are shown, each being connected with a solenoid that opens and closes a clearance pocket on one of the compressor cylinders, as shown on the drawings. By this means the clearance pockets are opened, and the compressor capacity is correspondingly reduced, as the volume of gas decreases in the gas holder, while these pockets are progressively closed with a corresponding increase in the compressor capacity with a rise in the level of the gas holder dome 32. Two limit switches are also preferably provided that connect with signal lights 37 and 38.

For simplicity of illustration the compressor 5 is shown on the drawing as a two-stage compressor, provided with an intercooler 40 for recooling the gas between the stages. It will be understood, however, that in most ammonia synthesis plants a larger number of compression stages is used. The compression cylinders of any of these later stages of compression may also be provided with clearance pockets or other unloaders of the type described above, although these are preferably used only with the first two or three stages of compression where the gas pressures are relatively low. It will be seen, therefore, that the principles of my invention are such that a close and automatic control of the compressor capacity can be obtained in response to the quantity of gas supplied through line 1, thereby avoiding the necessity of continuous manual operation of the compressors.

In the ammonia synthesis plant illustrated in Fig. 1 of the drawings it is necessary to maintain the supplies of hydrogen and nitrogen to the compressor at a constant molar ratio of 3:1. In accordance with another important feature of my invention this is done by means of a continuous gas analyzer A which analyzes a sample of the compressed nitrogen-hydrogen gas in the outlet line 41 from the last stage of compression and operates a control valve 42 in the nitrogen line 2 in accordance with the results of the analysis. Since the hydrogen supply is maintained under constant pressure by the gas holder 7 and the intake of nitrogen-hydrogen gas mixture in the inlet line 43 is maintained substantially constant by the automatic capacity control of the compressor, a gas mixture of constant composition can readily be obtained automatically by simple control of the amount of nitrogen supplied.

The ammonia synthesis converter 3 is preferably of the type described in U. S. Patent No. 1,909,378 provided with an internal heat exchanger for preheating the compressed nitrogen-hydrogen gases by heat exchange with the ammonia-containing gases leaving the catalyst. The main flow of compressed gas enters the converter through line 45 and passes through this heat exchanger. A by-pass line 46 is provided to supply cold gas directly to the catalyst basket in the converter, the amount of this gas being controlled by a valve mechanism 47 operated by a recorder-controller 48 in response to thermocouples within the catalyst.

Although the invention has been described with particular reference to the synthesis of ammonia it will be understood that the principles thereof are applicable to the compression of other gases. For example they may be utilized in urea synthesis processes wherein carbon dioxide is compressed and reacted with ammonia; in such a system the carbon dioxide would be admitted through the line 1 and the line 2 would not be used. Other processes that may be automatically controlled by the apparatus of the invention include the methanol synthesis, wherein a mixture of hydrogen and carbon monoxide is compressed, the Fischer-Tropsch synthesis of hydrocarbons from hydrogen and carbon monoxide, and the reforming of aliphatic hydrocarbons such as natural gas by catalytic reaction with steam. It will be understood, therefore, that the invention in its broadest aspects may be applied to the compression either of a single gas or of mixtures of gases, and that modifications and substitutions of equivalents may be resorted to within the scope of the appended claims.

What I claim is:

1. Gas compressing apparatus comprising in combination a gas compressor having a gas inlet, a gas outlet and an unloader, a gas supply line connected with said gas inlet, a constant pressure gas holder in free communication with said gas supply line, and means responsive to the quantity of gas in said gas holder for actuating said compressor unloader to vary the compressor capacity in accordance therewith.

2. Gas compressing apparatus comprising in combination a gas compressor having a gas inlet, a gas outlet, and a plurality of unloaders each having a solenoid-actuated valve, a gas supply line connected with said gas inlet of the compressor, a constant pressure gas holder in free communication with said gas supply line and having a vertically movable top, and a series of switches operating in response to vertical movement of said gas holder top and connected with the solenoids actuating said compressor unloader valve.

3. Apparatus for the synthesis of ammonia comprising in combination a gas compressor having an inlet for a nitrogen-hydrogen mixture, an unloader and an outlet connecting with a compressed gas line leading to a converter, a hydrogen supply line having a constant pressure gas holder in free communication therewith, a nitrogen supply line connecting with said hydrogen supply line between said compressor inlet and said gas holder, and means responsive to the quantity of gas in said gas holder for actuating said compressor unloader to vary the compressor capacity in accordance therewith.

4. Apparatus for the synthesis of ammonia comprising in combination a compressor having an inlet for a nitrogen-hydrogen mixture, a plurality of unloaders each having a solenoid-actuated valve, and an outlet connecting with a compressed gas line leading to a converter, a hydrogen supply line having in free communication therewith a constant pressure gas holder including a vertically movable top, a nitrogen supply line connecting with said hydrogen supply line between said compressor inlet and said gas holder, and a series of switches controlling the solenoids actuating said compressor unloader valves and operating in response to vertical movement of said gas holder top.

5. Apparatus for the synthesis of ammonia comprising in combination a compressor having an inlet for a nitrogen-hydrogen mixture, a plurality of unloaders and an outlet connecting with a compressed gas line leading to a converter, a hydrogen supply line having in free communication therewith a constant pressure gas holder, a nitrogen supply line connecting with said hydrogen supply line between said compressor inlet and said gas holder, means for maintaining a constant ratio between the nitrogen admitted through said nitrogen supply line and the hydrogen mixed therewith and means responsive to the quantity of gas in said gas holder for actuating said compressor unloaders to vary the compressor capacity in accordance therewith.

6. Apparatus according to claim 5 which includes a gas analyzer operatively connected with the compressed gas line for continuously analyzing the gas therein, and a valve in the nitrogen supply line controlled by said gas analyzer.

No references cited.